A. EBERSOLE.
ANIMAL RELEASER.
APPLICATION FILED DEC. 14, 1915.

1,256,449.

Patented Feb. 12, 1918.

Inventor
Andrew Ebersole

Witnesses
A. C. Newkirk

By Victor J. Evans
Attorney

UNITED STATES PATENT OFFICE.

ANDREW EBERSOLE, OF DODGE CITY, KANSAS.

ANIMAL-RELEASER.

1,256,449.

Specification of Letters Patent.  Patented Feb. 12, 1918.

Application filed December 14, 1915.  Serial No. 66,803.

*To all whom it may concern:*

Be it known that I, ANDREW EBERSOLE, a citizen of the United States, residing at Dodge City, in the county of Ford and State of Kansas, have invented new and useful Improvements in Animal-Releasers, of which the following is a specification.

This invention relates to animal releasing devices, and it has for its object to produce a simple, effective and improved device whereby a number of animals such as horses and cattle may be quickly released from their stalls in a barn or other structure in case of fire or other emergency.

A further object of the invention is to produce a simple and effective device including a swingingly supported bar, and means for actuating said bar whereby a plurality of links to which the halter straps of animals are made fast may be simultaneously and quickly released, thereby enabling the animals to escape in the event of fire or other emergency.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Corresponding parts in the several figures are denoted by like characters of reference.

Figure 1:
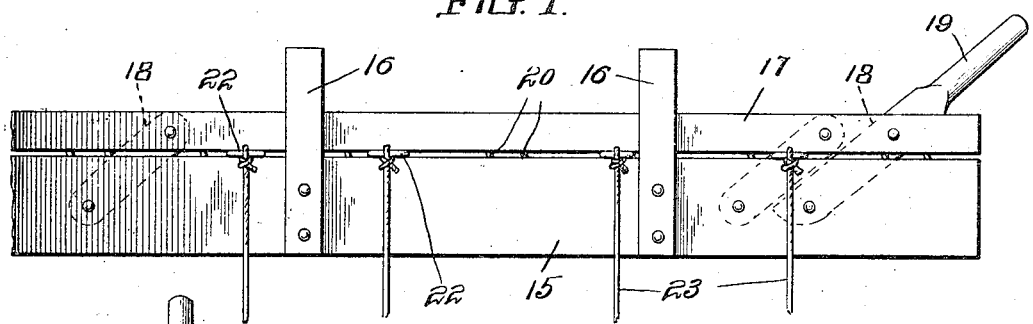
Figure 1 is a front view of a device constituting the invention showing the tie links secured.

The sill or bar 15 is provided on the front and rear sides thereof with upwardly extending arms 16 between which a bar 17 is guided for swinging movement in a vertical plane, said bar being connected with the sill by means of links 18, one of said links having an upwardly extending arm 19 constituting a handle or lever whereby the device may be operated. The swinging bar is provided at intervals along the length thereof with downwardly extending obliquely disposed pins 20 for the reception of which sockets 21 are formed in the top face of the sill. A plurality of tie links 22 are provided, said links being positioned between the opposed faces of the sill 15 and the bar 17 in engagement with the pins 20, whereby when the bar 17 is in a lowered position withdrawal of the links will be rendered impossible. Halter straps, some of which are shown at 23, may be made fast to the links by tying in the customary manner.

Figure 2:
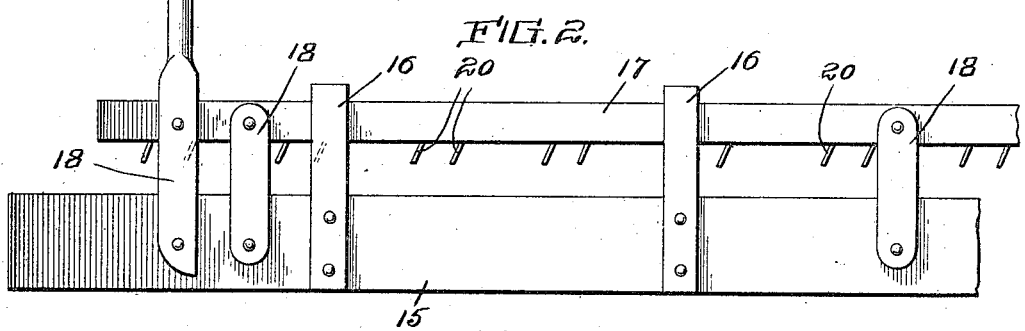
Fig. 2 is a rear view of the same showing the tie links released.
Figure 3:
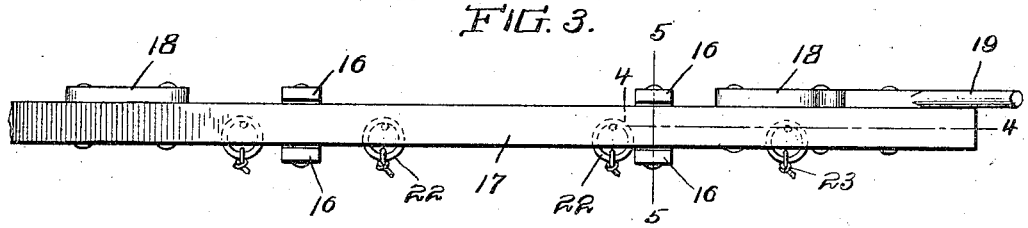
Fig. 3 is a top plan view.
Figure 4:
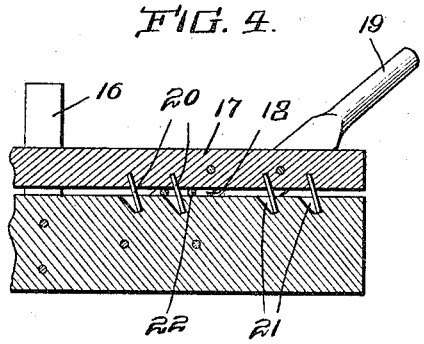
Fig. 4 is a longitudinal sectional view taken on the line 4—4 in Fig. 3.
Figure 5:
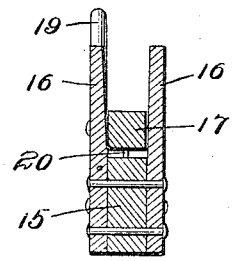
Fig. 5 is a transverse sectional view taken on the line 5—5 in Fig. 3.

Ordinarily the bar 17 occupies a lowered position, as clearly seen in Fig. 1, thereby maintaining the pins 20 in engagement with the sockets 21, and thus holding the tie links securely against withdrawal. The bar 17, being sufficiently heavy, may be depended upon to remain in its lowered position gravitationally, although within the scope of the invention securing means of any well known kind may be provided. To release the animals under ordinary circumstances the halter ropes are untied from the links. In case of fire or other emergency, however, an operator by manipulating the lever handle 19, may swing the bar 17 upwardly to the position shown in Fig. 2, disengaging the pins 20 from the sockets 21 and the links 22, releasing the latter and freeing the animals.

When an emergency happens, necessitating the quick release of the animals, experience has taught that the animals will instinctively pull on the tie ropes in an effort to release themselves. If the pins 20 were disposed vertically there would be great danger of the links 22 remaining hung up on the pins by frictional engagement therewith as long as the animal would continue to pull on the tie rope, thereby preventing the release and defeating the object of the invention. By disposing the pins obliquely as herein described, this danger is completely avoided because a pull on the tie rope exerted in a lateral direction would of necessity result in moving the link out of engagement with the pin. It is, however, necessary that the entire length of each pin be disposed obliquely with respect to the bar 17 as clearly shown in the drawing.

Having thus described the invention, what is claimed as new is:—

A device of the character described comprising a sill, pairs of spaced uprights secured upon opposite sides thereof to form guides, a bar of the same width as said sill disposed thereon between said uprights, links pivotally connected with said sill and said bar, a handle on one of said links, and a plurality of pins extending from the lower side of said bar in an inclined direction and engageable within V-shaped recesses in the upper side of said sill, the inclination of said pins preventing binding when said bar is moved.

In testimony whereof I affix my signature in presence of two witnesses.

ANDREW EBERSOLE.

Witnesses:
 FRED CUMMINS,
 CLYDE E. SMITH.

Copies of this patent may be obtained for five cents each, by addressing the "Commissioner of Patents, Washington, D. C."